No. 832,331. PATENTED OCT. 2, 1906.
J. F. MORSE.
EDUCATIONAL APPARATUS.
APPLICATION FILED MAY 19, 1904.

Witnesses:
Grant Beebe
Charles A. Peters

Inventor:
Joseph Fairbanks Morse.

UNITED STATES PATENT OFFICE.

JOSEPH FAIRBANKS MORSE, OF CHICAGO, ILLINOIS.

EDUCATIONAL APPARATUS.

No. 832,331.

Specification of Letters Patent.

Patented Oct. 2, 1906.

Application filed May 19, 1904. Serial No. 208,732.

*To all whom it may concern:*

Be it known that I, JOSEPH FAIRBANKS MORSE, a citizen of the United States, residing at 7327 Stewart avenue, in the city of Chicago, county of Cook, and State of Illinois, have invented a new and useful Educational Apparatus to be Known as the "Heliodon," of which the following is a specification.

My invention is intended to show the apparent paths of the sun through the sky at times of equinox and solstice with reference to the compass-points and zenith of an observer at any latitude. I attain these objects by the mechanism illustrated in the accompanying drawings, in which—

Figure 4:
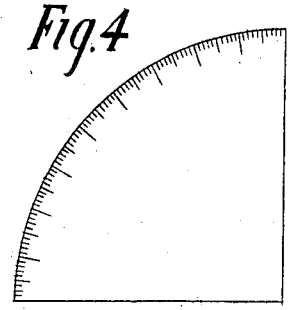
Figure 2:
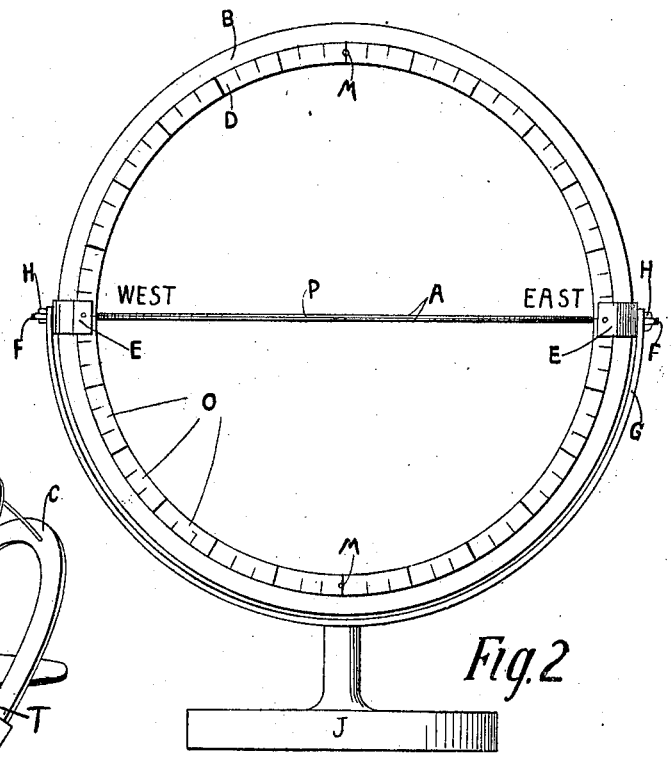
Figure 1:
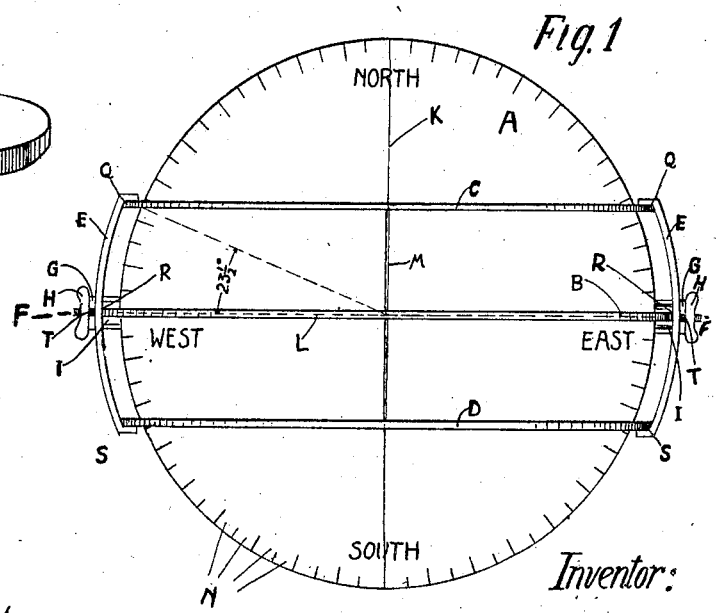

Figure 1 is a top view; Fig. 2, a side view, and Fig. 3 a perspective view. Fig. 4 shows a truncated quadrant used to adjust the heliodon to different latitudes.

Like letters refer to like parts throughout the several views.

A is a disk or ring representing or indicating in miniature the portion of the earth's surface inclosed by an observer's horizon. On both sides of said horizon disk or ring are marked the four cardinal points of compass in such relative positions that if the disk or ring after being oriented with one side up is inverted by rotation on the north-to-south line as axis its compass-points will still correspond with local directions. (See lines of direction K and L, Fig. 1.) To facilitate estimating directions of sunrise and sunset from the observer, the circumference of said horizon disk or ring is divided into five-degree spaces, as shown at N, Fig. 1.

B is a ring having its internal diameter equal to the diameter of the horizon-disk or to the external diameter of the horizon-ring representing the "sky-path" of the sun at equinox times.

C and D are rings of an internal diameter equal to the chord of the horizon-disk drawn parallel to its diameter at a distance of twenty-three and one-half degrees or to the external chord of the horizon-ring similarly drawn. (See Fig. 1.) C represents the sun's sky-path at the June solstice, and D the sun's path at the December solstice. On the outer side of each solstice-ring are marked equal time-spaces—twenty-four or a multiple of twenty-four—as shown at O, Fig. 2. (See also Fig. 3.)

E E are connecting arms or links to which the three rings are firmly fixed parallel with each other at points bisecting each—Q Q, R R, S S, Fig. 1. (See also Fig. 3.)

F F are pins passing through the centers of the connecting-arms (see Fig. 3) and through enlargements of the central ring I I, Fig. 1, and firmly fixed in the horizon disk or ring at opposite ends of the east-to-west diameter. Said pins rest in slots T T, Fig. 1, of a curved support G, Fig. 3, which is fastened to the base J, Figs. 2 and 3. With the connecting-arms thus pivoted to the horizon disk or ring the three parallel rings can be revolved around said disk or ring and fixed in any position by the thumb-nuts H H.

M M (see Fig. 3) are wires or threads connecting the three rings at points midway between the links and representing a portion of the observer's meridian.

Figure 3:
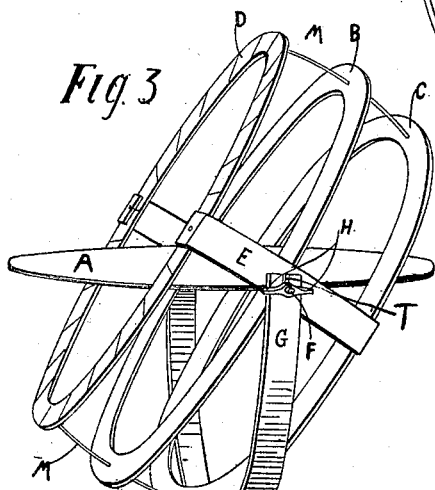

The heliodon is set for any given latitude by orienting the horizon disk or ring with the local points of compass and inclining the equinox-ring (see B, Fig. 3) as many degrees from the vertical (the position for the equator) as the observer is supposed to be from the equator, but in the opposite direction, (southward, if the observer is north of the equator, and vice versa,) and tightening thumb-nuts H, Fig. 3.

In adjusting the heliodon for different latitudes in the manner just described the middle ring is leaned away from the vertical position to the desired angular extent by means of a quadrant of the same radius as said middle ring and having one side cut away half the thickness of said disk, said quadrant being a separable part of the heliodon and being placed, when used, on the north-to-south line of said disk, with said truncated side down and the other side perpendicular to the center of said disk. The cutting away of one side of said quadrant half the thickness of the disk is for the purpose of bringing said side down to the true plane of said disk, said true plane of disk passing midway between its surfaces, as located by the line (see P, Fig. 2) bisecting the edge of said disk.

It is evident that an apparatus constructed in the manner I have described can be used as a changeable diagram or model to demonstrate the following conditions and facts relating to the seasons:

First. The sun's sky-path—direction from the observer throughout the day—at equinox and solstice times for any latitude.

Second. The limits within which the sun's sky-path shifts in the course of a year—hence the approximate distribution of insolation through the year for any latitude.

Third. The reverse distribution of insolation through the year on opposite sides of the equator, the slant of the rings being the same for the same latitude, whether north or south, but the times of longest and shortest days and of greatest and least altitude of noon sun being reversed by the inclination of the rings in opposite directions. Reversal of temperature seasons on opposite sides of the equator may also be shown by placing the rings in position for a given latitude and then lifting horizon disk or ring from the support and inverting it by rotation on the north-to-south diameter as axis and restoring pins to slots. The rings are then in correct position for the same latitude on the other side of the equator.

Fourth. The length of equinox and solstice days at any latitude, the equinox-ring being always bisected by the horizon disk or ring and the solstice-rings being cut more and more unequally by the horizon plane up to the position for the arctic or antarctic circle and beyond that clearing the horizon disk or ring altogether. The portions of the solstice-rings above or below the horizon plane can be read in hours by means of the time-spaces marked on these rings.

Fifth. The latitude required for a given or known length of solstice day—a problem requiring trigonometrical calculation without the heliodon.

Sixth. That all latitudes receive an equal amount of sunshine (six months) in the course of a year, since the horizon plane always bisects the space included between the solstice-rings.

Seventh. That intensity of yearly insolation decreases with approach to the poles, since the amount of inclination of the rings increases with latitude up to the horizontal polar position.

Eighth. Why twilight periods increase in length with approach to the poles, the increasing slant of the sun-paths bringing the sun more gradually to and from the horizon.

What I claim as my invention, and wish to secure by Letters Patent, is—

1. In an apparatus of the character described, the combination of a circular means, representing the horizon circle of an observer at any latitude; said circular means being encircled by three parallel rings; the middle ring being of an internal diameter equal to the diameter of said circular means; the two outer rings being of an internal diameter equal to the chord of said circular means drawn parallel to a diameter at a distance of twenty-three and one-half degrees; said parallel rings being firmly connected with each other with said outer rings as far from said middle ring, on either side, as said chord of said circular means drawn parallel to a diameter, at a distance of twenty-three and one-half degrees is from said parallel diameter; said parallel rings being pivotally secured to said circular means at opposite ends of a diameter, with parallel rings in such position that an internal diameter of said middle ring coincides with said pivotal diameter of said circular means; substantially as described, and for the purpose set forth.

2. In an apparatus of the character described, the combination of a disk, representing the portion of the earth's surface inclosed by an observer's horizon; said disk being encircled by three parallel rings; the middle ring being of an internal diameter equal to the diameter of said disk; the two outer rings being of an internal diameter equal to the chord of said disk drawn parallel to a diameter at a distance of twenty-three and one-half degrees; said parallel rings being firmly connected with each other with said outer rings as far from said middle ring, on either side, as said chord of disk drawn parallel to a diameter at a distance of twenty-three and one-half degrees is from said parallel diameter; said parallel rings being pivotally secured to said disk at opposite ends of a diameter by pivot-pins bisecting the middle ring; grooved ends of a support receiving said pivot-pins; said pivot-pins being threaded, resting in said grooved ends of said support, and being provided with thumb-nuts, for clamping said parallel rings in fixed position at any stage of their revolution about said disk; margin of said disk being marked off into equal degree-spaces; sides of said outer rings being marked off into equal time-spaces—twenty-four, or a multiple, or divisor, of twenty-four; substantially as described, and for the purpose set forth.

3. In an apparatus of the character described the combination of a disk, representing the horizon circle of an observer at any latitude; said disk being encircled by three parallel rings, firmly connected with each other, and pivotally secured to said disk at opposite ends of a diameter, representing the east-to-west direction, by pivot-pins bisecting the middle ring; grooved ends of a support receiving said pivot-pins; said pivot-pins being threaded, resting in said grooved ends of said support, and being provided with thumb-nuts, for clamping said parallel rings in fixed position at any stage of their revolution about said disk; said middle ring being of an internal diameter equal to the diameter of said disk, and demonstrating the apparent path of the sun through the sky at equinox times, as viewed from center of said horizon-disk; the two outer rings being of an internal diameter equal to the chord of said disk drawn parallel to a diameter at a distance of twenty-three and one-half degrees, and being placed as far from the middle ring, on either side, as said chord of disk is from the diameter parallel to it; said outer rings demonstrating the solstice sky-paths of the sun, as viewed from center of said horizon-disk; the sides of said outer rings being marked off into equal time-spaces—twenty-four, or a multiple, or divisor, of twenty-four—to facilitate exact reading of length of solstice days; the circumference of said horizon-disk being marked off into equal degree-spaces, to facilitate exact reading of direction of rising and setting of solstice sun; suitable linear means connecting said middle ring directly with each outer ring, at the two points of said middle ring midway between its points of bisection by said pivot-pins, said linear means representing a portion of the meridian, as imagined from center of said horizon-disk; for bringing said middle ring to the proper angle with said disk, when adjusting the heliodon for different latitudes, a quadrant, of the same radius as the middle ring, and having one side cut away half the thickness of the horizon-disk, to bring said side down to the true plane of the disk, said quadrant being a separable, but essential part of the heliodon, and being placed, when used, upon the north-to-south line of said disk, with said truncated side down and the other side perpendicular to the center of said disk; said true plane of disk being located by a line bisecting the edge of said disk; substantially as described, and for the purpose set forth.

In testimony whereof I have signed my name to this specification in the presence of two subscribing witnesses.

JOSEPH FAIRBANKS MORSE.

Witnesses:
LEONARD LIONEL BAILEY,
CLYDE P. LAMAR.